W. H. AYRES.
PROCESS OF DRESSING UP CUTTING TOOLS.
APPLICATION FILED SEPT. 17, 1913.
1,096,009.  Patented May 12, 1914.
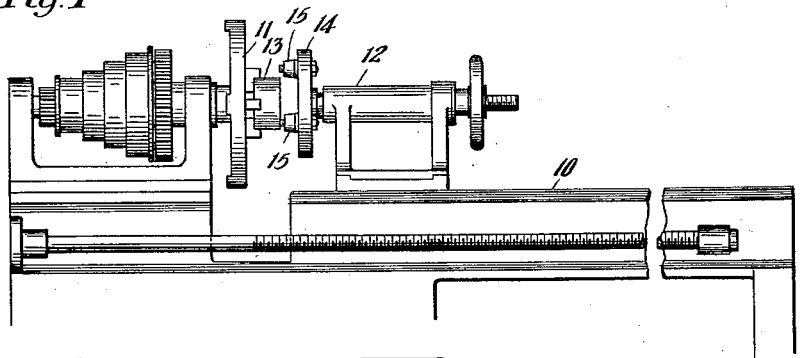
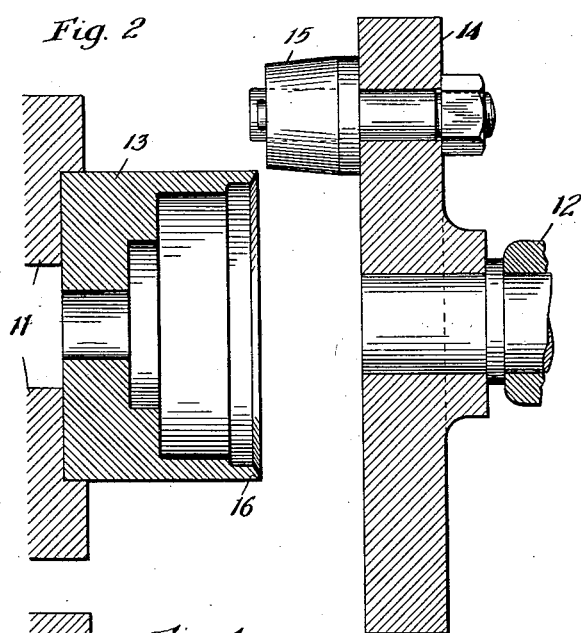
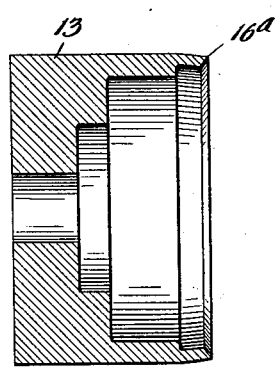
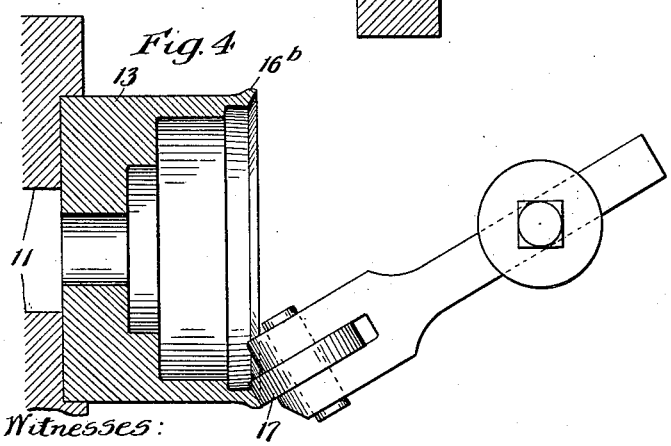
Witnesses:
Wm. Geiger
Esther Abrams
Inventor:
William H. Ayres
By Munday, Evarts, Adcock & Clarke
Attys.

UNITED STATES PATENT OFFICE.

WILLIAM HOWARD AYRES, OF BALTIMORE, MARYLAND, ASSIGNOR TO AMERICAN CAN COMPANY, OF NEW YORK, N. Y., A CORPORATION OF NEW YORK.

PROCESS OF DRESSING UP CUTTING-TOOLS.

1,096,009. Specification of Letters Patent. Patented May 12, 1914.

Application filed September 17, 1913. Serial No. 790,232.

*To all whom it may concern:*

Be it known that I, WILLIAM HOWARD AYRES, a citizen of the United States, residing in Baltimore, in the State of Maryland, have invented a new and useful Improvement in Processes of Dressing Up Cutting-Tools, of which the following is a specification.

This invention relates to an improvement in process of dressing up cutting tools such as dies and punches and is more particularly directed to the process of truing, sizing and sharpening round dies and punches such as are used in machines for stamping and drawing can ends.

As is well known, punches and dies used for cutting and drawing can ends or other articles wear and lose their proper diameter from continued use, thus causing the cutting and forming of imperfect can ends. These dies and punches are extremely hard and hitherto it has been found practically impossible to properly upset or swage them for redressing, since it has been the general custom to do this by means of a hammer. The use of a hammer for upsetting or swaging the cutting edges of dies or punches or other cutting tools tends to crack or check or disintegrate the metal forming the cutting edge to such an extent that the redressing of the same is rendered either impossible or impractical.

By experiment, I have found that annular dies and punches may be rapidly and easily dressed and made substantially as good as new and without danger of disintegration or deterioration of the cutting or shearing edges by placing the punch, die or other cutting tool in an ordinary lathe chuck and upsetting, swaging or flowing the metal of the cutting edge by pressing thereagainst a roller or rollers held in the tail-stock of the lathe, the face or faces of the roller or rollers while engaging the punch or die being inclined thereto.

In the drawing forming a part of this specification, I have shown my improved method or process as applied to the redressing of a punch but, as will be understood, this is merely illustrative of the principles involved.

In said drawing, Figure 1 is a side elevation of a portion of an ordinary lathe showing the punch about to be dressed clamped in the lathe chuck and the rollers mounted on the tail-stock of the lathe. Fig. 2 is an enlarged sectional view of a portion of the lathe chuck, the punch and the support carrying the swaging or upsetting roller. Fig. 3 is a sectional view showing the punch as the same appears at the completion of the first operation shown in Fig. 2, and Fig. 4 is another view showing the second step employed in the process.

In the drawing, 10 denotes a lathe which may be of any well known construction, the same being provided with a chuck 11 and tail-stock 12. The annular punch 13 is mounted in the chuck 11 in the usual manner and the tail-stock carries a plate 14 on which are mounted a plurality of tapered, hardened, swaging rollers 15, the faces of which are slightly inclined from the axis of rotation of the lathe chuck. While the punch is being rotated in the lathe, the swaging rollers 15 are pressed against the cutting or shearing edge 16 of the punch and the metal upset or displaced inwardly as shown at $16^a$ in Fig. 3. After this operation, another type of swaging roller, shown at 17 in Fig. 4, is forced against the metal forming the shearing edge of the punch as shown in said figure, thereby upsetting the metal and forcing the same outwardly as shown at $16^b$. After the metal has been upset or flowed as above described, the punch is then redressed to proper size by grinding or otherwise removing the surplus metal on the exterior of the punch.

With my improved method, the metal forming the shearing edge is upset or swaged and caused to flow gradually and uniformly and the metal is not cracked, checked or otherwise disintegrated, with the result that when the tool is ground the same is practically as good as new.

Although I have herein shown and described my process as applied to a punch, yet it will be understood that the process is also adapted for operation on other cutting tools and also that variations and modifications in the steps and sequence of the steps may be employed without departing from the spirit of the invention.

I claim:

1. The herein described method or process of truing, sizing and sharpening tools having shearing edges such as punches, dies and the like, which consists in relatively rotating the tool and a swaging roller bearing against the cutting edge and simultaneously exerting pressure thereon to uniformly upset and flow the metal forming the cutting edge of the tool and subsequently redressing the tool to its original size, substantially as specified.

2. The herein described process of truing, sizing and sharpening a punch having an annular cutting edge, which consists in rotating the punch and while the punch is rotating upsetting the metal forming the cutting edge inwardly by pressing a swaging roller thereagainst and then upsetting the metal forming the cutting edge outwardly by pressing another swaging roller thereagainst and subsequently grinding the punch to its original size.

Signed this 8 day of Sept., 1913, in the presence of two witnesses.

WILLIAM HOWARD AYRES.

Witnesses:
J. A. HAGAN,
T. B. SPILLEN.

Copies of this patent may be obtained for five cents each, by addressing the "Commissioner of Patents, Washington, D. C."